O. COE.
Subsoil-Plow.

No. 41,603. Patented Feb 16, 1864.

Witnesses:
R. T. Campbell
E. Shafer

Inventor:
Orman Coe
by his Attys.
Mason Fenwick Lawrence

UNITED STATES PATENT OFFICE.

ORMAN COE, OF PORT WASHINGTON, WISCONSIN.

IMPROVEMENT IN PLOWS.

Specification forming part of Letters Patent No. 41,603, dated February 16, 1864.

*To all whom it may concern:*

Be it known that I, ORMAN COE, of Port Washington, in the county of Ozaukee and State of Wisconsin, have invented a new and Improved Subsoil-Plow with Rotary Pulverizing Attachment; and I do hereby declare that the following is a full, clear, and exact description thereof, reference being had to the accompanying drawings, making a part of this specification, in which—

Figure 1:
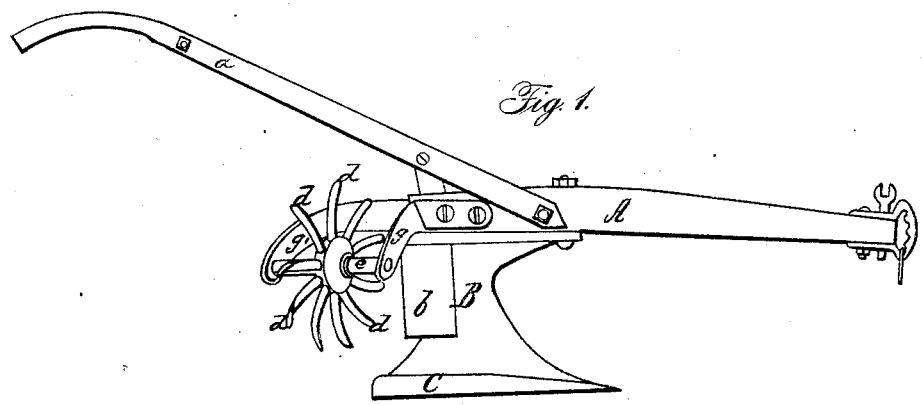
Figure 2:
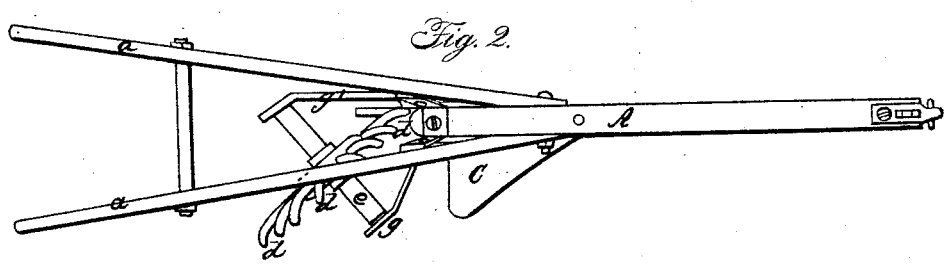
Figure 4:
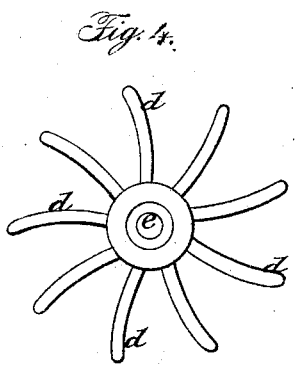
Figure 3:
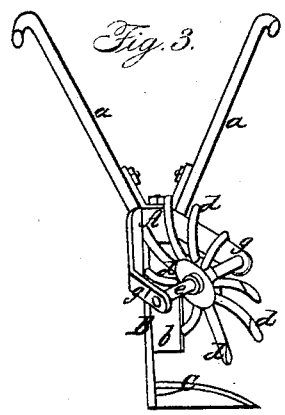

Figure 1 is a side elevation of my improved plow. Fig. 2 is a top view of same. Fig. 3 is a rear end view; and Fig. 4 is a view of the harrow detached from the plow.

Similar letters of reference indicate corresponding parts in the several figures.

The object of my invention is to pulverize and mellow the soil as it is lifted and stirred by a subsoil-plow, thus leaving the soil in a light and open condition for the reception of plants or for the cultivation of the same.

My invention consists in combining with a subsoil-plow, constructed as will be hereinafter described, a peculiarly constructed rotary pulverizing contrivance, the axis of which is arranged in rear of the plow-standard in a line which is oblique to the line of draft, so that as the implement is drawn along the tines of the harrow will strike the ground and pulverize the surface and subsoil, and at the same time clear away weeds, stubble, and other rubbish without liability of becoming clogged.

To enable others skilled in the art to make and use my invention, I will proceed to describe its construction and operation.

The subsoil-plow which I use with my improved harrow is constructed as follows:

A is the beam of the plow, and *a a* are the handles thereof.

B is a plate, which is secured rigidly to the beam A near its rear end, and, extending downward, this plate B receives on its lower end the share-plate C, the upper surface of which is convex and wedge form, as represented in Figs. 1, 2, and 3. The standard B has its front edge sharpened and curved, as shown in Fig. 1, for the purpose of cutting through roots, sods, &c., and on one side of this standard, opposite the land side, a plate, *b*, is secured, extending down from the beam A nearly to the share-plate C. This plate or wing *b* flares outward and extends backward a short distance to form a shallow vertical channel in the ground for the purpose of allowing the harrow-teeth to enter the soil and to work well at a considerable depth, as will be hereinafter described.

The pulverizing device consists of a number of tines, *d*, which are secured around and radiate from the hub of an axle, *e*. The ends of the axle have their bearings in two arms, *g g'*, of different lengths. These arms are secured to and project out behind and on one side of the beam A, and they are bent in such a manner that the axle *e* is supported in a position obliquely to the line of draft, as shown in Fig. 2. This brings the ends of the tines, as the pulverizer rotates, directly in rear of the space between the rear edges of the standard B and plate *b*, and consequently in the channel which is formed in the earth by the plate *b*. The length of the pulverizer-tines *d* and the position of the pulverizer may be such that the ends of the tines will loosen and stir the soil nearly as deep as the share-plate enters the ground; or, in other words, the entire body of earth which is lifted by the share-plate C will be acted upon and disintegrated by the teeth of the pulverizer, which may be set so as to stir any depth wished, from three to eight inches, of the earth lifted by the share-plate.

The peculiarity of the pulverizer consists in the shape given to its tines, which are all curved inward or toward the body of earth which they act upon, giving a dished or concave appearance to the pulverizer, which enables it to receive the earth better than if the teeth were straight. The ends of the tines are flattened down to an edge and again bent, as represented in Fig. 4, so that the teeth are each slightly twisted. This latter curve has the effect of preventing the teeth from gathering weeds, stubble, or anything which would be likely to clog the teeth, while the flattening of the ends of the teeth allows them to enter and leave the ground freely, and greatly facilitates the operation of pulverizing clods of earth, as the flattened end of each tooth enters the ground edgewise. The oblique position which is given to the pulverizer causes it to scrape through the ground as the implement is drawn along, and at the same time to revolve. The plate *b* forms a shallow channel in the ground, through which the pulverizer-teeth revolve, and this channel allows the teeth to pass a short distance below the surface of the ground before they commence to stir the loosened earth which is lifted by the convex share-plate C. The subsoil is in this manner stirred in with the surface-soil, and the operation of the flattened tines is to force upward the subsoil, and at the same time to break the clods and uproot the weeds.

For heavy subsoil-plowing the implement above described will be found very useful, as the standard which carries the share-plate C serves as a colter for opening the earth to allow the tines of the revolving pulverizer to enter freely. Without such a device as this colter the teeth of the pulverizer would not enter land which is tough and filled with sods and other such obstructions, but the combination of this colter standard with the pulverizer arranged behind it, so that its teeth will enter the ground through the channel which is formed behind said standard, allows the teeth of the pulverizer to enter the ground as far as the subsoil with freedom and to operate with great perfection in pulverizing the soil.

Having thus described my invention, what I claim as new, and desire to secure by Letters Patent, is—

1. The curved tined pulverizer arranged and supported in rear of the plow-beam A in a plane obliquely to the line of draft, in combination with the plate $b$, which forms a wide channel in the ground to allow the tines to enter freely, substantially as and for the purposes described.

2. Although I do not claim broadly a revolving pulverizer having teeth on its edge, I do claim such having flattened and curved teeth, substantially as shown and described.

3. Arranging in rear of the colter-standard of a subsoil-plow the revolving curved toothed pulverizer, substantially as described.

ORMAN COE.

Witnesses:
GEO. W. FOSTER,
HARVEY G. TURNER.